(12) United States Patent
Beheydt et al.

(10) Patent No.: US 10,594,758 B2
(45) Date of Patent: Mar. 17, 2020

(54) LATENCY REDUCTION BY SENDING AUDIO AND METADATA AHEAD OF TIME

(71) Applicant: Cisco Technology, Inc., San Jose, CA (US)

(72) Inventors: Samie Beheydt, Geluwe (BE); Jan Armand Josefine De Smet, Lokeren (BE); Henk Derudder, Ypres (BE)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 15/842,945

(22) Filed: Dec. 15, 2017

(65) Prior Publication Data

US 2019/0190975 A1 Jun. 20, 2019

(51) Int. Cl.
*H04L 29/06* (2006.01)

(52) U.S. Cl.
CPC ........ *H04L 65/607* (2013.01); *H04L 65/4069* (2013.01); *H04L 65/4084* (2013.01); *H04L 65/605* (2013.01)

(58) Field of Classification Search
CPC .................................................... H04L 65/607
See application file for complete search history.

(56) References Cited

U.S. PATENT DOCUMENTS

| 5,793,980 | A * | 8/1998 | Glaser ................... | H04H 20/28 370/352 |
| 6,754,271 | B1 * | 6/2004 | Gordon ................ | H04N 5/4401 348/385.1 |
| 9,538,210 | B2 * | 1/2017 | Beheydt ............ | H04N 21/23608 |
| 9,667,422 | B1 * | 5/2017 | Androulaki ......... | G06F 12/1408 |
| 10,390,071 | B2 * | 8/2019 | Sethuraman ....... | H04N 21/8456 |
| 2009/0006643 | A1 * | 1/2009 | Lee ................... | H04N 21/23424 709/231 |
| 2009/0083279 | A1 * | 3/2009 | Hasek ................. | H04L 67/2823 |
| 2012/0106921 | A1 * | 5/2012 | Sasaki ................ | H04N 21/2362 386/230 |
| 2013/0091251 | A1 * | 4/2013 | Walker ............... | H04N 21/6125 709/219 |
| 2013/0293677 | A1 * | 11/2013 | Lee .................... | H04N 21/4307 348/43 |
| 2013/0315573 | A1 * | 11/2013 | Sasaki ................ | H04N 19/597 386/356 |
| 2014/0010517 | A1 * | 1/2014 | Sheffler ............... | H04N 9/79 386/226 |
| 2014/0282262 | A1 * | 9/2014 | Gregotski .......... | H04N 21/2387 715/838 |
| 2015/0117550 | A1 * | 4/2015 | Narasimhan ..... | H04N 21/23605 375/240.26 |

(Continued)

*Primary Examiner* — Lashonda T Jacobs
(74) *Attorney, Agent, or Firm* — Merchant & Gould P.C.

(57) ABSTRACT

Latency reduction by sending audio and metadata ahead of time may be provided. First, an encoder may receive a source. Next, the encoder may create a transport stream from the source. The transport stream may comprise a plurality of first data units and a plurality of second data units. The plurality of second data units may respectively correspond to the plurality of first data units. The plurality of first data units are preceded in time in the transport stream by their respective corresponding ones of the plurality of second data units. A packager may then receive the transport stream and package data chunks from the transport stream.

19 Claims, 5 Drawing Sheets

(56) References Cited

U.S. PATENT DOCUMENTS

| | | | |
|---|---|---|---|
| 2016/0119657 A1* | 4/2016 | Sun | H04N 21/6118 |
| | | | 725/94 |
| 2016/0234528 A1* | 8/2016 | Narasimhan | H04L 65/607 |
| 2016/0308958 A1* | 10/2016 | Navali | H04N 21/2662 |
| 2017/0064342 A1* | 3/2017 | Botsford | H04N 21/23439 |
| 2017/0127093 A1* | 5/2017 | Tsukagoshi | H04N 21/236 |
| 2018/0184146 A1* | 6/2018 | Pichon | H04L 65/602 |
| 2018/0255116 A1* | 9/2018 | Kaufman | H04L 65/4092 |
| 2018/0310075 A1* | 10/2018 | Casal Martin | H04L 65/60 |

\* cited by examiner

LATENCY REDUCTION BY SENDING AUDIO AND METADATA AHEAD OF TIME

TECHNICAL FIELD

The present disclosure relates generally to data stream transportation.

BACKGROUND

Adaptive bitrate (ABR) streaming is a method of video streaming over Hypertext Transfer Protocol (HTTP) where the source content is encoded at multiple bit rates, then each of the different bit rate streams are segmented into small multi-second or sub-second parts. The streaming client is made aware of the available streams at differing bit rates, and segments of the streams by a manifest file. When starting, the client typically requests the segments from the lowest bit rate stream. If the client finds the download speed is greater than the bit rate of the segment downloaded, then it may request the next higher bit rate segments. Later, if the client finds the download speed for a segment is lower than the bit rate for the segment, and therefore the network throughput has deteriorated, then it may request a lower bit rate segment. The segment size can vary depending on the particular implementation, but they are typically between two and ten seconds.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Latency reduction by sending audio and metadata ahead of time may be provided. First, an encoder may receive a source. Next, the encoder may create a transport stream from the source. The transport stream may comprise a plurality of first data units and a plurality of second data units. The plurality of second data units may respectively correspond to the plurality of first data units. The plurality of first data units are preceded in time in the transport stream by their respective corresponding ones of the plurality of second data units. A packager may then receive the transport stream and package data chunks from the transport stream.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Reducing latency in an ABR environment is desired to improve user experience. A large part of latency in an ABR system may be generated by a packager in the ABR system. The packager may receive a video stream and (multiple) audio/data streams from an ABR encoder and may package these streams in an ABR format (e.g., HTTP Live Streaming (HLS), HTTP Dynamic Streaming (HDS), HTTP Smooth Streaming (HSS), Dynamic Adaptive Streaming over HTTP (DASH)). A large part of the packaging latency may be due to a difference in a decoding delay between the video stream and the audio/data streams. The contribution of the decoder delay difference to the packager latency may be significant (e.g., multiple seconds). Embodiments of the disclosure may provide reduction of this latency.

Figure 1:
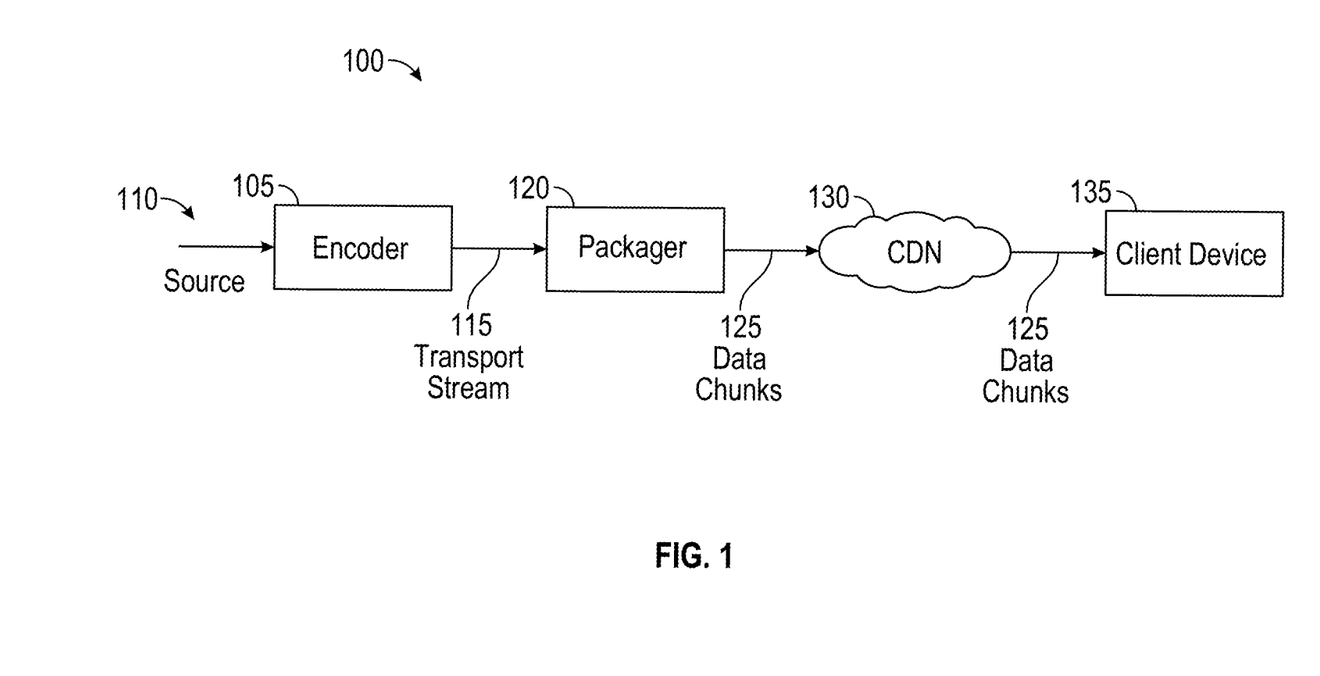
FIG. 1 is a block diagram of an operating environment for providing latency reduction.

FIG. 1 is a block diagram of an operating environment 100 for providing latency reduction. As shown in FIG. 1, operating environment 100 may comprise an encoder 105, a source 110, a transport stream 115, a packager 120, data chunks 125, a Content Delivery Network (CDN) 130, and a client device 135. Encoder 105, packager 120, or client device 135 may be embodied by computing device 500 described in greater detail below with respect to FIG. 5. Notwithstanding, encoder 105, packager 120, or client device 135 may be embodied in hardware and/or in software (including firmware, resident software, micro-code, etc.). Client device 135 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device. CDN 130 may comprise a collection of web servers and network components for example.

ABR video, audio, and metadata may be packaged in small media files (e.g., chunks) that may have a fixed duration (e.g., 2 s). Each ABR chunk may be fully decodable on its own (i.e., it may not need previous chunks for decoding). Audio and video that may be contained in an ABR chunk may be aligned (i.e., a first audio sample in the chunk may correspond to a first video sample in the chunk). With ABR, a single video/audio source may be encoded in multiple representations that may have different resolutions, framerates, and/or bitrates. Each of these representations may be separated into individually decodable chunks. Moreover, the chunk boundaries may be aligned (i.e., the corresponding chunks of the individual representations may start with the same video frame/audio sample). Aligning the chunk boundaries may allow an ABR client to switch between the available representations at the chunk boundaries. This may allow the ABR client to switch to an appropriate representation based on the network bandwidth it has available at a certain moment of time. When the ABR client has a high network bandwidth available, it may switch to a representation that may have a higher video resolution, framerate, and bitrate. When the available bandwidth is lower, the ABR client may switch to a representation with a lower video resolution, framerate, and bitrate.

In order for the ABR client to switch between the available representations at the chunk boundaries, the chunks of the individual representations may need to be video frame aligned (and within a chunk, audio may be aligned with video). Consequently, services may be encoded by encoder 105, packaged (i.e., cut in data chunks 125) by packager 120, and delivered to client device 135 over CDN 130. Encoder 105 may encode source 110 to a video/audio format that may be needed and may generate a set of representations of the ABR service (e.g., different resolutions, framerates, and bitrates). Encoder 105 may also determine the chunk size and chunk alignment by inserting Encoder Boundary Points (EBPs) into transport stream 115. These EBPs may be inserted, for example, at regular intervals (e.g., 2 s) on the video Packet Identifier (PID) (alternatives are possible depending on the ABR format).

Figure 2:
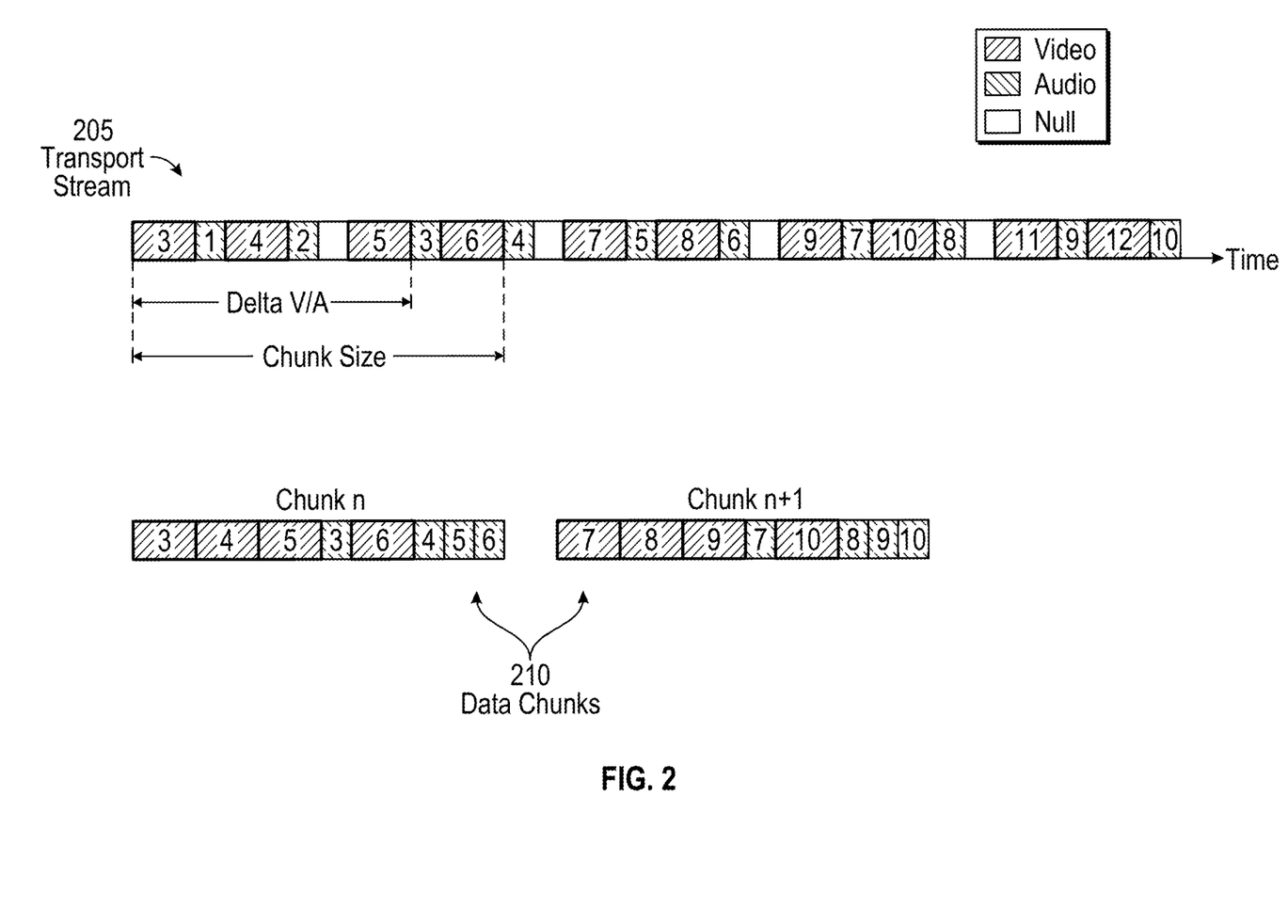
FIG. 2 illustrates a conventional transport stream.

FIG. 2 illustrates a conventional transport stream 205. As illustrated in FIG. 2, a conventional packager may read the EBPs and may create data chunks 210 that may align with these EBP boundaries. In order to create data chunks 210, conventional packager 120 may remove transport stream null packets from conventional transport stream 205. In other words, the conventional packager may cut conventional transport stream 205 based on the video EBPs. The conventional packager may then manipulate the audio packets to compensate for the difference in video and audio decoding delay (e.g., the video packets may be sent earlier in time than corresponding audio packets). The first audio frame in data chunks 210 may be the one that corresponds with the first video frame in data chunks 210 and the last audio frame in data chunks 210 may be the one that corresponds with the last video frame in data chunks 210 as illustrated in FIG. 2. This kind of manipulation may not only apply to audio, but may also apply to timestamped metadata (e.g., teletext, subtitles, etc.).

As shown in FIG. 2, the null portions illustrate transport stream null packets, the audio portions illustrate transport stream packets that may contain audio, and the video portions illustrate transport stream packets that may contain video. Delta V/A may represent the difference in decoding delay of video and audio that may cause video to be sent earlier in time than the corresponding audio in conventional systems. When creating data chunks 210, the audio may be aligned with the video that may result in multiple consecutive audio packets added at the end of data chunks 210. The conventional packager may remove transport stream packets that may not be needed for the ABR format (e.g., Program Specific Information (PSI)/SI tables) and may add a single Program Association Table (PAT) and Program Map Table (PMT) section at the start of each of data chunks 210.

Conventional transport stream 205 may comprise an adaptive transport stream and may be a fully compliant MPEG-2 Transport Stream. Conventional transport stream 205 may comply with the video, audio, and metadata decoder buffer models, and that hence may be decoded by any standard compliant video/audio decoder. Conventional transport stream 205 may be received by the conventional packager that may package the video/audio content into an ABR format (e.g., HLS, HDS, HSS, DASH). Packaging, by the conventional packager, may involve slicing transport stream 205 in small files (i.e., data chunks 210) that can be decoded independently of any other chunk. Some ABR formats (e.g., HLS) may multiplex both video and its corresponding audio content in the same chunks while other formats (e.g., HSS) may keep video and audio in separate chunks. Packaging may also involve the generation of a playlist file (i.e., a manifest file) that may show all available chunks that may be accessed by a client device for playback. For low-latency live video/audio content, it may be important that the packaging happens as quickly as possible and the new chunk be added to the playlist file as quickly as possible. Publishing a new chunk in the playlist may require both the video and the audio to be packaged.

Because conventional transport stream 205 may be fully MPEG-2 Transport Stream compliant, the decoder buffer models of video and audio may be compliant with the applicable video/audio standards (e.g., Advanced Video Coding (AVC) for video and AAC for audio). The decoder buffer of a video decoder may be much bigger (e.g., may be as large as 2 s-3 s) than for an audio decoder (e.g., may be 100 ms-200 ms). This may mean that a video decoder may buffer much more data than an audio decoder. Because a video decoder may buffer much more data than an audio decoder, the compressed video information that is generated by conventional encoders may be sent multiple seconds ahead of the corresponding audio information. As a result, with conventional transport stream 205, a conventional packager may receive the video information from the conventional encoder and can start creating the new chunk. However, the conventional packager has to wait (e.g., multiple seconds) for the corresponding audio information before it can finalize the chunk and publish it in the playlist.

As stated above, delta V/A in FIG. 2 may be the difference in decoder buffer delay between video and audio. The numbers in the video Access Units (AUs) and audio AUs signal the correspondence between video AUs and audio AUs (e.g., video AU 3 corresponds with audio AU 3). As shown in FIG. 2, Chunk n ends with video AU 6, but finalization of Chunk n needs to wait until audio AU 6 has been received by the conventional packager. When the (e.g., maximum) video decoder buffer delay is 2 s and the (e.g., maximum) audio decoder delay is 100 ms, the added latency in the packager may be 1.9 s. In this example, for a chunk duration of 2 s, this may mean that waiting to finalize the chunk until audio AU 6 has been received by the conventional packager almost doubles the packager latency (i.e., from a minimum packager latency of 2 s to a latency of 3.9 s). As described below with respect to FIG. 3, embodiments of the disclosure may solve this problem by sending the audio information (e.g., audio AUs) ahead in time of its corresponding video information (e.g., video AUs).

Figure 3:
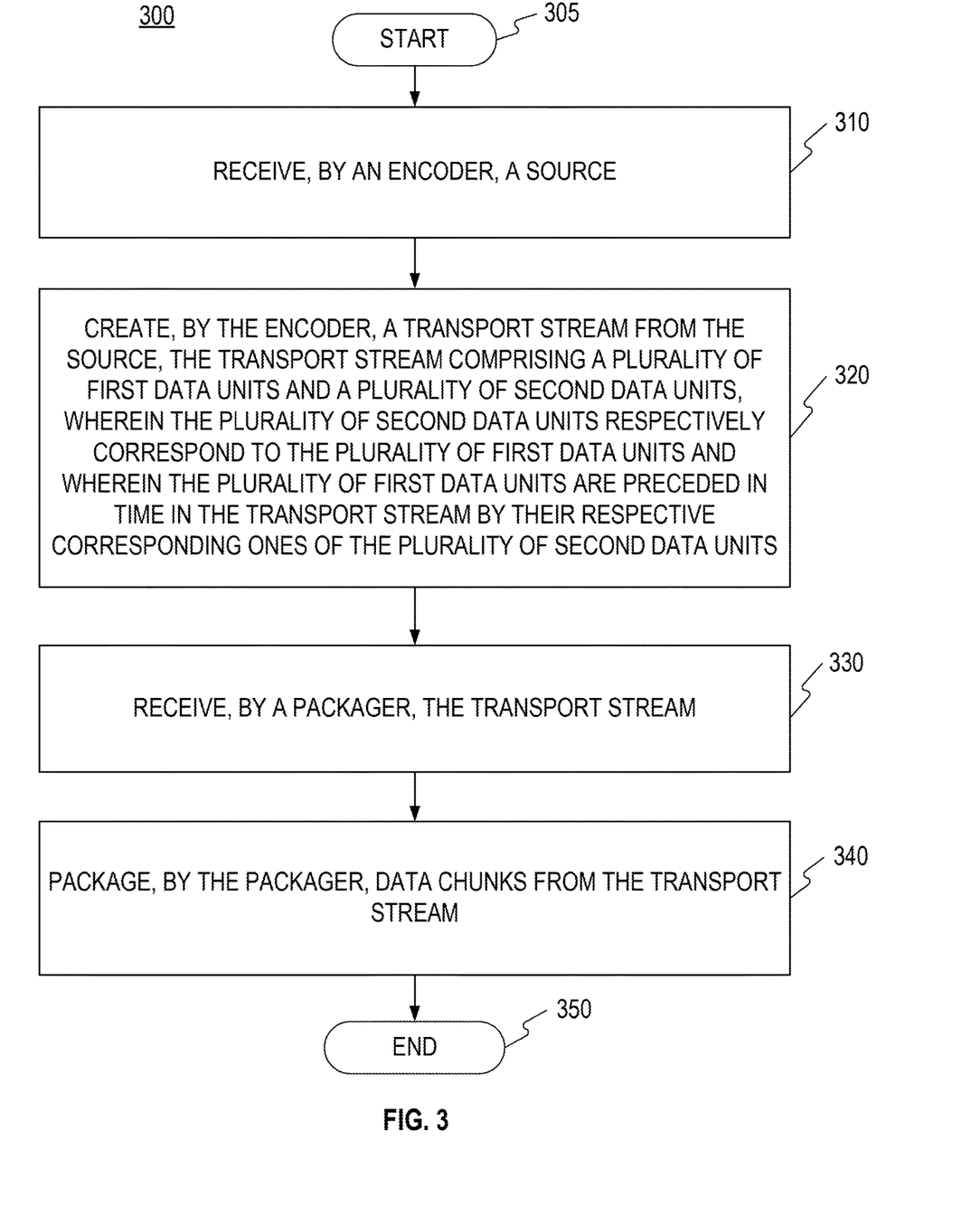
FIG. 3 is a flow chart of a method for providing latency reduction.

FIG. 3 is a flow chart setting forth the general stages involved in a method 300 consistent with an embodiment of the disclosure for providing latency reduction. Method 300 may be implemented using encoder 105 and packager 120 as described in more detail above with respect to FIG. 1. Ways to implement the stages of method 300 will be described in greater detail below.

Method 300 may begin at starting block 305 and proceed to stage 310 where encoder 105 may receive source 110. For example, encoder 105 may receive source 110 comprising video streams, audio streams, data streams, and timestamped metadata (e.g., teletext, subtitles, etc.) corresponding to a content program.

From stage 310, where encoder 105 receives source 110, method 300 may advance to stage 320 where encoder 105 may create transport stream 115 from source 110. Transport stream 115 may comprise an Adaptive Transport Stream (ATS). Furthermore, transport stream 115 may comprise a plurality of first data units and a plurality of second data units that respectively correspond to the plurality of first data units. The plurality of first data units may be preceded in time in transport stream 115 by their respective corresponding ones of the plurality of second data units. For example, the coded data in transport stream 115 may be organized into Network Abstraction Layer (NAL) units, each of which may comprise a packet that may contain an integer number of bytes. A set of NAL units in a specified form may be referred to as an Access Unit (AU). The plurality of first data units may comprise video data (e.g., video AUs). The plurality of second data units comprise audio data (e.g., audio AUs) or time stamped metadata AUs that correspond to their respective video AUs.

Figure 4:
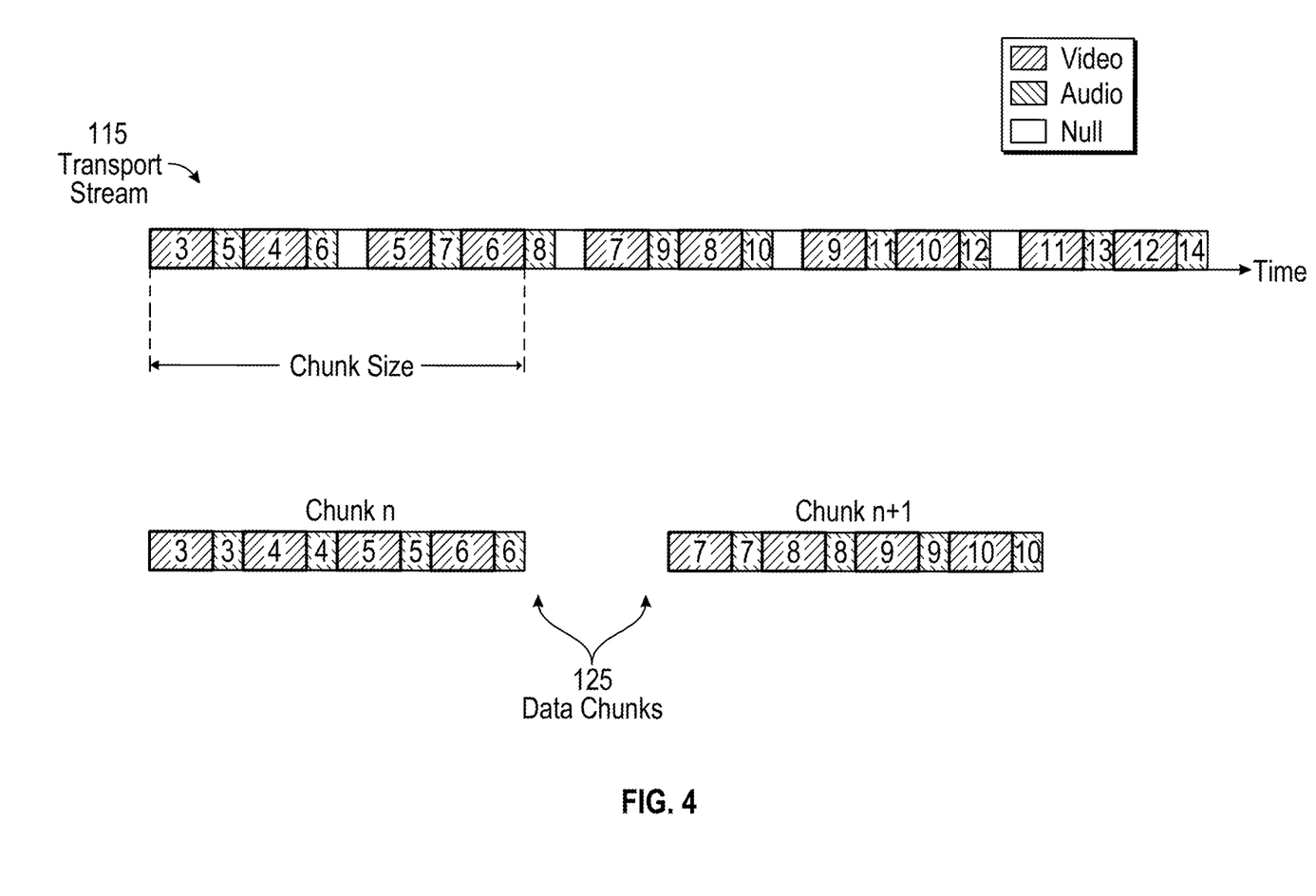
FIG. 4 illustrates transport stream for providing latency reduction.

FIG. 4 shows a transport stream 115 consistent with embodiments of the disclosure. As shown in FIG. 4, transport stream 115 may comprise a video AU 3, a video AU 4, a video AU 5, a video AU 6, a video AU 7, a video AU 8, a video AU 9, a video AU 10, a video AU 11, and a video AU 12 (e.g., these video AUs may comprise the plurality of first data units). In addition, transport stream 115 may comprise an audio AU 5, an audio AU 6, an audio AU 7, an audio AU 8, an audio AU 9, an AU 10, an audio AU 11, an audio AU 12, an audio AU 13, and an audio AU 14 (e.g., these audio AUs may comprise the plurality of second data units). In transport stream 115, audio AUs (e.g., audio AU 5, audio AU 6, audio AU 7, audio AU 8, audio AU 9, audio AU 10, audio AU 11, audio AU 12) are sent by encoder 105 in time ahead of their corresponding video AUs (e.g., video AU 5, video AU 6, video AU 7, video AU 8, video AU 9, video AU 10, video AU 11, and video AU 12). Accordingly, consistent with embodiments of the disclosure, encoder 105 may facilitate latency reduction by sending the audio information (e.g., and all time stamped metadata) ahead in time of its corresponding video information when it creates transport stream 115. In this way, packager 120 does not have to wait for the corresponding audio information before it finalizes data chunks 125.

Transport stream 115 may not be a fully compliant MPEG-2 Transport Stream because it may comprise audio information (e.g., and all time stamped metadata) that is ahead in time of its corresponding video information. For ABR applications there may be no reason to keep a transport stream a fully compliant MPEG-2 Transport Stream because an ABR decoder decodes files that are sent as a whole and faster than real-time. Instead of maintaining a compliant audio decoder buffer model at the encoder (e.g., encoder 105) output, embodiments of the disclosure may send the audio information before the video information. Audio may be easier to encode than video and it may take less time in the ABR encoder (e.g., encoder 105) to encode. This may help facilitate sending the audio information before the video information. The aforementioned process applies when timestamped metadata (e.g., subtitles, teletext, etc.) comprises the plurality of second data units in place of or in addition to audio AUs.

Once encoder 105 creates transport stream 115 from source 110 in stage 320, method 300 may continue to stage 330 where packager 120 may receive transport stream 115. After packager 120 receives transport stream 115 in stage 330, method 300 may proceed to stage 340 where packager 120 may package data chunks 125 from transport stream 115. For example, when the audio information (i.e., the plurality of second data units) is sent in transport stream 115 by encoder 105 to packager 120 ahead of the video information (i.e., the plurality of first data units), the packaging (e.g., by packager 120) of a chunk ends with the reception of the last video frame of the chunk and packager 120 no longer needs to wait for the corresponding audio frames before sending the chunk. For example, as shown in FIG. 4, once packager 120 has video AU 6, it can finalize Chunk n because it already received audio AU 6 and does not have to wait for audio AU6. (In contrast, if packager 120 were processing transport stream 205 instead of transport stream 115, packager 120 would have to wait delta A/V to finalize Chunk n because it takes that long to get audio AU 6.) Accordingly, embodiments of the disclosure may provide latency reduction by eliminating this wait. Once packager 120 packages data chunks 125 from transport stream 115 in stage 340, method 300 may then end at stage 350.

Figure 5:
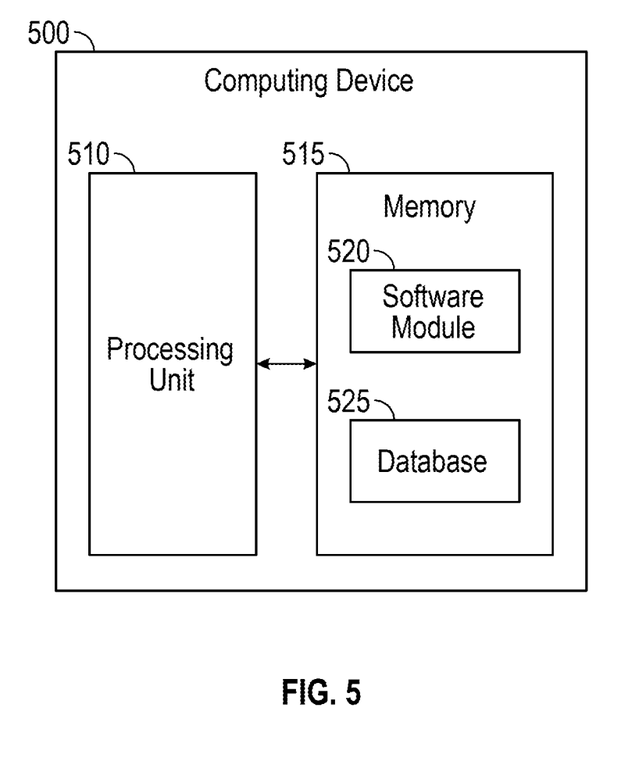
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for providing latency reduction, including for example, any one or more of the stages from method 300 described above with respect to FIG. 3. Computing device 500 may provide an operating environment for any one of more of encoder 105, packager 120, and client device 135. Encoder 105, packager 120, and client device 135 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a camera, a load balancer or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by an encoder, a source;
   creating, by the encoder, a transport stream from the source, the transport stream comprising a plurality of first data units and a plurality of second data units, wherein the plurality of second data units respectively correspond to the plurality of first data units, and wherein the plurality of first data units are preceded in time in the transport stream by their respective corresponding ones of the plurality of second data units; and
   sending the transport stream to a packager, wherein the packager is operative to package data chunks from the transport stream, wherein a packed data chunk ends with a last first data unit of the plurality of first data units for a data chunk, and wherein packaging of the data chunk ends with receipt of the last first data unit for the data chunk.

2. The method of claim 1, wherein creating the transport stream comprising the plurality of first data units comprises creating the transport stream comprising the plurality of first data units comprising video data.

3. The method of claim 1, wherein creating the transport stream comprising the plurality of first data units comprises creating the transport stream comprising the plurality of first data units comprising video Access Units (AUs).

4. The method of claim 1, wherein creating the transport stream comprising the plurality of second data units comprises creating the transport stream comprising the plurality of second data units comprising at least one of the following: audio data and time stamped metadata.

5. The method of claim 1, wherein creating the transport stream comprising the plurality of second data units comprises creating the transport stream comprising the plurality of second data units comprising at least one of the following: audio Access Units (AUs) and time stamped metadata Access Units (AUs).

6. The method of claim 1, further comprising:
   receiving, by a packager, the transport stream; and
   packaging, by the packager, the data chunks from the transport stream.

7. The method of claim 6, further comprising sending, by the packager, the data chunks.

8. The method of claim 7, wherein sending the data chunks comprises sending the data chunks over a content delivery network (CDN).

9. A system comprising:
   a memory storage; and
   a processing unit coupled to the memory storage, wherein the processing unit is operative to:
      receive a transport stream, the transport stream comprising a plurality of first data units and a plurality of second data units respectively corresponding to the plurality of first data units wherein the plurality of first data units are preceded in time in the transport stream by their respective corresponding ones of the plurality of second data units; and
      package data chunks from the transport stream, wherein a packed data chunk ends with a last first data unit of the plurality of first data units for a data chunk, and wherein packaging of the data chunk ends with receipt of the last first data unit for the data chunk.

10. The system of claim 9, wherein the transport stream comprises an adaptive transport stream.

11. The system of claim 9, wherein the plurality of first data units comprise video data.

12. The system of claim 9, wherein the plurality of first data units comprise video Access Units (AUs).

13. The system of claim 9, wherein the plurality of second data units comprise at least one of the following: audio data and time stamped metadata.

14. The system of claim 9, wherein the plurality of second data units comprise at least one of the following: audio Access Units (AUs) and time stamped metadata Access Units (AUs).

15. A computer-readable medium that stores a set of instructions which when executed perform a method executed by the set of instructions comprising:
    receiving a source;
    creating a transport stream from the source, the transport stream comprising a plurality of first data units and a plurality of second data units, wherein the plurality of second data units respectively correspond to the plurality of first data units and wherein the plurality of first data units are preceded in time in the transport stream by their respective corresponding ones of the plurality of second data units; and
    sending the transport stream to a packager, wherein the packager is operative to package data chunks from the transport stream, wherein a packed data chunk ends with a last first data unit of the plurality of first data units for a data chunk, and wherein packaging of the data chunk ends with receipt of the last first data unit for the data chunk.

16. The computer-readable medium of claim 15, wherein creating the transport stream comprising the plurality of first data units comprises creating the transport stream comprising the plurality of first data units comprising video data.

17. The computer-readable medium of claim 15, wherein creating the transport stream comprising the plurality of first data units comprises creating the transport stream comprising the plurality of first data units comprising video Access Units (AUs).

18. The computer-readable medium of claim 15, wherein creating the transport stream comprising the plurality of second data units comprises creating the transport stream comprising the plurality of second data units comprising at least one of the following: audio data and time stamped metadata.

19. The computer-readable medium of claim 15, wherein creating the transport stream comprising the plurality of second data units comprises creating the transport stream comprising the plurality of second data units comprising at least one of the following: audio Access Units (AUs) and time stamped metadata Access Units (AUs).

* * * * *